United States Patent Office 3,043,790
Patented July 10, 1962

3,043,790
BUTADIENE-STYRENE COPOLYMER-CEMENT COMPOSITION AND METHOD OF PREPARATION
Philip F. Sanders, Glen Mills, Pa., assignor to E. I. du Pont de Nemours and Company, Wilmington, Del., a corporation of Delaware
No Drawing. Filed Sept. 20, 1957, Ser. No. 685,078
5 Claims. (Cl. 260—29.7)

This invention relates to additive compositions for modifying the properties of Portland cement compositions and to the resulting cement, mortar and concrete compositions and methods for their manufacture. More specifically, the additive compositions to which the invention relates are characterized by containing a copolymer of styrene and butadiene-1,3 dispersed in water with certain minor amounts of non-ionic, anionic, and polyorganosiloxane surfactants.

I have found that the use of the modified styrene-butadiene copolymer dispersions of this invention in combination with Portland cement greatly improves various properties of cement-containing mixes. Thus in comparison with mortars and concretes prepared without the additive, the modified cement compositions of this invention require the use of less water to obtain standard flow and working consistency and the mortar or concrete obtained has improved strength, especially when cured under adverse curing conditions, flexibility, adhesion, and elongation at break as well as smaller volume change.

The Portland cement additive compositions of this invention are, in more detail, aqueous dispersions of a copolymer of styrene and butadiene-1,3 having a styrene: butadiene weight ratio of about 30:70 to 70:30 and, based on the weight of the styrene-butadiene copolymer, (a) 2–10% of non-ionic surfactant, (b) 1–7.5% of anionic surfactant, at least 15% of which is a sodium higher alkyl (i.e., at least nine carbon atoms) sulfate, and (c) 1–5% of polyorganosiloxane surfactant. Additionally, the amounts of non-ionic surfactant, (a), and anionic surfactant, (b), are regulated so that their sum, or total amount, is not more than about 11% by weight of the styrene-butadiene copolymer and the ratio of (a) to (b) [(a):(b)] is about 0.7:1–10:1.

The concentration of styrene-butadiene copolymer in the cement additive compositions of the invention can be varied widely as desired or convenient, up to about 60% by weight of the copolymer, but care should be taken, of course, not to have so much water in the additive composition that when added to a cement, mortar, or concrete mix to provide sufficient of the additive, it at the same time introduces more water than is needed to make a mix having desired flow and working consistency. In general, the additive composition is added in amount sufficient to provide in the mix from 5%–25% by weight of the copolymer based on the weight of the Portland cement. Thus the additive composition preferably contains from about 40% to 75% by weight of water, but in no event more than the amount which would provide in the cement or concrete mix greater than about 40% water based on the weight of the Portland cement.

The styrene-butadiene-1,3 copolymers employed in the compositions and methods of the invention can be prepared in aqueous emulsion in accordance with known procedures. For example, the styrene and butadiene monomers can be mixed in the proportions corresponding to the composition of the desired copolymer in water containing an emulsifying agent or agents and heated with agitation in the presence of a peroxide catalyst to initiate copolymerization. See, for example, Ryden U.S. Patent 2,498,712.

Some or all of the non-ionic and anionic surfactants employed in the cement additive compositions of the invention can be present while effecting copolymerization of the styrene and butadiene. Ordinarily, however, it is preferred to follow the practices used in making styrene-butadiene emulsions for use in preparing the so-called latex paints. Thus some but not necessarily all of the anionic surfactant is introduced to aid in effecting the desired dispersion and emulsification in carrying out the copolymerization of butadiene and styrene, and non-ionic surfactant is subsequently added to stabilize the resulting polymer dispersion. The polyorganosiloxane surfactant and such additional quantities of non-ionic surfactant and anionic surfactant as are required to complete the cement additive composition are subsequently introduced.

Illustrative of non-ionic surfactants are, for example: fatty acid esters such as glycerol monostearate, diethyleneglycol laurate, propyleneglycol monostearate, sorbitol monolaurate, and pentaerythritol monostearate; acid derivatives of ethylene oxide products such as the reaction produc of six mols of ethylene oxide with one of oleic acid; condensation products of ethylene oxide with alcohols such as stearyl alcohol; and condensation products of ethylene oxide with phenols, naphthols, and alkyl phenols such as octylphenoxynonaoxyethyleneethanol. Preferred are the condensation products of ethylene oxide with alkyl phenols.

Illustrative of anionic surfactants are, for example: the alkyl aryl sulfonates such as dodecylbenzene sodium sulfonate; sulfate derivatives of higher fatty alcohols (i.e., alcohols of at least nine carbon atoms and ordinarily not more than seventeen carbon atoms) such as sodium lauryl sulfate; the sulfonated animal and vegetable oils such as sulfonated fish and castor oils; sulfonated acyclic hydrocarbons; and the like. As pointed out heretofore, at least 15% of the anionic surfactant component of the cement additive of the invention should be a sodium higher alkyl sulfate such as sodium lauryl sulfate and preferably the anionic surfactant component consists of a mixture of an alkyl aryl sulfonate surfactant and such sodium higher alkyl sulfate.

The foregoing and other non-ionic and anionic surfactants are disclosed, as are trade names and sources of supply for such materials, in McCutcheon "Synthetic Detergents" (Macnair-Dorland Company, 1950).

Illustrative of the polyorganosiloxanes are the condensation products resulting from polymerization of organo silane diols, as represented by the formula

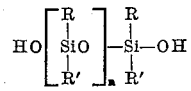

where R and R', in the above formula, represent organic radicals such as alkyl, aryl, aralkyl and alkaryl or heterocyclic groups, and $n$ is one or more. Also useful are polymerization products of organo silane diols in the presence of an organo silane monol, and condensation products obtained from mixtures of organo silane triols, diols, and monols.

Preferably the organo substituent of the siloxanes is lower alkyl (i.e., methyl, ethyl, propyl), cyclohexyl or phenyl. Most preferably it is methyl, and, accordingly, the preferred polyorganosiloxanes are those which are condensation products of methyl silicols, and most preferably condensation products of dimethyl silane diol.

Polyorganosiloxanes are commercially available in several forms which are designated in the trade as "silicone fluids," "silicone emulsions" and "silicone compounds," the latter being siloxanes modified by the addition of a small percentage of finely divided silica or other inert divided solid. Any of these forms can be used in the practice of this invention.

The term "Portland cement" is used herein to include generally the kind of product obtained by heating lime-clay mixtures, or natural cement-rock, to such a temperature that practically the entire product is sintered, followed by grinding. Various additives can be included, of course, in accordance with conventional Portland cement manufacturing practices. It will be understood, of course, that various modifications such as the hydraulic cements of the kind commonly known as calcium-aluminate cements can be used in place of Portland cement as substantial equivalents therefor in the compositions and methods of the invention.

Cement mixes are made according to the present invention by simply adding the cement additive of the invention to the cement with mixing and such added water as is necessary to obtain a cement mix of desired flow and working consistency. If the cement additive of the invention and Portland cement are to be employed in the manufacture of mortar or concrete by admixture with a mineral aggregate, such as sand or a mixture of sand with gravel, crushed stone or equivalent coarse aggregate, the cement will ordinarily constitute, in accordance with conventional practices, more than about 10% by weight of the mineral aggregate and usually from about 15 to 30% of the weight of the mineral aggregate.

The cement mixes of the invention can be applied as a paint for application, for example, to stucco, cinder block, cement block, plaster, concrete, wood, etc. The cement mortar and concrete mixes of the invention can also be flowed into molds or forms to provide, upon setting, structures or objects of the kind for which conventional cement, mortar and concrete mixes are now used.

While it is generally convenient to prepare the cement additive composition of the invention as a unitary product by pre-combining the styrene-butadiene copolymer, non-ionic, anionic, and polyorganosiloxane surfactants and then introducing the resulting mixture into the cement, cement-sand, or cement-sand-coarse aggregate mixture in making cement, mortar, or concrete mixes, it will be understood, of course, that it is not necessary that all the various components of the additive be so premixed. For example, equivalent cement, mortar, or concrete mixes are obtained by separate addition of the requisite quantity of styrene-butadiene copolymer emulsion containing sufficient of the anionic and non-ionic surfactants to avoid coagulation of the latex, the polyorganosiloxane surfactant, and such additional non-ionic and anionic surfactants as are necessary.

Compositions of the invention, methods for their preparation, and properties of the compositions are illustrated by the following detailed examples which are given in addition to the examples recited above. Parts and percentages are by weight unless otherwise specified.

EXAMPLE 1

The styrene-butadiene copolymer used in this example is of a kind marketed commercially in the form of an aqueous emulsion for use in making what are now known as latex paints. The emulsion contains 47% of styrene-butadiene-1,3 copolymer, and, based on the weight of that copolymer, approximately 5% of the non-ionic surfactant octylphenoxynonaoxyethyleneethanol, about 0.5% of the anionic surfactant dodecyl-benzene sodium sulfonate, and about 0.5% of the anionic surfactant sodium lauryl sulfate. To prepare the cement additive of this example, there is added to this emulsion 2.5%, based on the weight of the copolymer, of sodium lauryl sulfate and 2.5% based on the weight of the copolymer of polymethyl siloxane emulsion containing 29% of the siloxane. Thus the cement additive has the following composition:

| | Parts |
|---|---|
| Butadiene-styrene copolymer | 100 |
| Non-ionic surfactant | 5 |
| Anionic surfactant | 3.5 |
| Polyorganosiloxane | 2.5 |
| Water | 119 |

A cement mortar mix is made by intimately mixing the above quantity of cement additive with 500 parts Portland cement, 1500 parts sand (graded standard natural silica sand from Ottawa, Illinois, as described in ASTM specification C–109–54T), and 41 parts water using the mixing method identified as ATSM designation C–305–55T "Mechanical Mixing of Hydraulic Cement Mortars of Plastic Consistency" and the standard mixing equipment described in said method.

The cement mix of this example is useful for preparing cement, plaster, floor topping, tank lining, sprayed concrete and the like for which conventional cement mixes are commonly used and is particularly useful for patching and resurfacing of concrete roads, sidewalks and wood floors. Various physical properties of the mix of this example and the cured product obtained therefrom are given in Table II hereafter in comparison with several products in which one or more of the additive components are omitted.

The composition of the cement mortar mixes used for comparison with the product of this example are shown in Table I below. They are identified as comparative products A, B, and C respectively. The additive components used in the comparative products B and C correspond in composition to those employed in the product of this Example 1 of the invention. The mixing method used in preparing the comparative products is the same as that used in making the product of Example 1. The quantity of water used is such as to give approximately the same consistency in all the mortar mixes.

*Table I*

| | Comparative Product | | |
|---|---|---|---|
| | A | B | C |
| Portland Cement | 500 | 500 | 500 |
| Sand | 1,500 | 1,500 | 1,500 |
| Water | 275 | 212 | 140 |
| Styrene-butadiene copolymer | | | 100 |
| Anionic surfactant | | 5 | 1 |
| Non-ionic surfactant | | | 5 |
| Polyorganosiloxane | | 5 | |

Pertinent physical data on the products described in this example are given in Table II. All such data except that relating to tensile strength and elongation at break are obtained according to the ASTM methods indicated in the table. Tensile strength is determined using an Instron tester. It is carried out at 25° C. using a one inch cube test specimen from the center of a 1 x 1 x 6 inch sample, a recorder speed of five inches per minute, and a cross-head speed of .05 inch per minute. Instron Model TTB is used with a D-cell. The standard specimen holder of the instrument is milled to accommodate the test sample and expose the one inch cube between the jaws. The percent elongation at break is determined on the same instrument and in conjunction with the tensile strength determination.

It will be seen in Table II that two sets of data are given for each product under the several headings compression strength, flexural strength, tensile strength, and elongation at break. The cement products on which these tests are made are first cured for 24 hours at 25° C. and at 95–100% relative humidity. Certain samples are then kept at 25° C. and 50% relative humidity and tests made upon them, as indicated in Table II, after 7 days and 28 days, including the 24 hour initial cure. Other samples are immersed in water immediately after the initial 24 hour cure and kept in water at 25° C. until tested, as indicated in Table II, after 7 days and 28 days.

*Table II*

|  | Product of Example 1 | Comparative Products | | |
|---|---|---|---|---|
|  |  | A | B | C |
| Air Content of Mix (ASTM C-185-55T), Percent | 13 | 8 | 13.8 | 40 |
| Set Time (ASTM C-229-52T), minutes | 170 | 250 | 150 |  |
| Compression Strength (ASTM C-349-54T), lbs./sq. in.: |  |  |  |  |
| (1) 25° C., 50% relative humidity— |  |  |  |  |
| 7 days | 2,400 | 2,400 | 2,200 | 490 |
| 28 days | 3,200 | 2,700 | 2,380 | 530 |
| (2) in water— |  |  |  |  |
| 7 days | 2,300 | 2,300 | 2,180 | 205 |
| 28 days | 2,700 | 2,800 | 2,775 | 245 |
| Flexural Strength (ASTM C-348-54T), lbs./sq. in.: |  |  |  |  |
| (1) 25° C., 50% relative humidity— |  |  |  |  |
| 7 days | 920 | 460 | 370 | 225 |
| 28 days | 1,490 | 570 | 510 | 225 |
| (2) in water— |  |  |  |  |
| 7 days | 950 | 630 | 540 |  |
| 28 days | 1,200 | 840 | 730 | 225 |
| Volume Change (ASTM C-157-54T for 28 days at 25° C. and 50— rel. humitity), Percent: |  |  |  |  |
| Maximum Shrinkage | .03 | .07 | .05 | .05 |
| Maximum Expansion | .02 | .05 | .04 | .09 |
| Tensile Strength: |  |  |  |  |
| (1) 25° C., 50% relative humidity— |  |  |  |  |
| 7 days | 400 | 190 | 275 | 74 |
| 28 days | 660 | 240 | 373 | 85 |
| (2) in water— |  |  |  |  |
| 7 days | 290 | 210 | 300 | 18 |
| 28 days | 440 | 370 | 388 | 12 |
| Elongation at Break, Percent: |  |  |  |  |
| (1) 25° C., 50% relative humidity— |  |  |  |  |
| 7 days | .35 | .12 | .13 | .38 |
| 28 days | .39 | .06 | .01 | .61 |
| (2) in water— |  |  |  |  |
| 7 days | 0.33 | .13 | .03 | .58 |
| 28 days |  | .12 | .07 | .34 |

It will be seen from the data in Table II that the product of Example 1, a cement composition of this invention, has greatly improved flexural strength and tensile strength over that of the comparative products especially when it is cured under adverse curing conditions. Additionally, it has greater stretchability than comparative products A and B as indicated by the data on elongation at break, and exhibits less volume change than the comparative products. It is noted as a characteristic of comparative product C that considerable air is entrained in making the mortar mix for that product according to the standard mixing specification identified heretofore and it is believed that the relatively low strength characteristics of the resulting concrete are related to the air content.

EXAMPLE 2

This example illustrates a cement paint composition of the invention. The styrene-butadiene copolymer employed in the paint is introduced into the paint as an emulsion of the copolymer having approximately the following composition:

|  | Parts |
|---|---|
| Copolymer (67% styrene and 33% butadiene) | 21 |
| Anionic surfactant | .2 |
| Non-ionic surfactant | 1 |
| Water | 20 |

2 parts of a 25% solution in water of sodium lauryl sulfate and 1.7 parts of a 29% dispersion in water of polymethyl siloxane are mixed in 8.8 parts of water. The resulting mix is then intimately mixed along with the aforesaid styrene-butadiene emulsion and Portland cement to give a cement paint having the following composition:

|  | Parts |
|---|---|
| Portland cement | 100 |
| Styrene-butadiene emulsion—48% polymer content | 43 |
| 25% aqueous solution sodium lauryl sulfate | 2 |
| 29% emulsion polymethyl siloxane | 1.7 |
| Water | 8.8 |

The cement paint of this example is adapted for application to stucco, cinder block, cement block, wood, glass, metal, concrete, etc. and exhibits excellent adhesion.

While the invention has been described in detailed examples with particular reference to specific embodiments, it will be appreciated that no unnecessary limitations are to be understood therefrom. The invention is not limited to the exact details shown and described for obvious modifications will occur to those skilled in the art.

I claim:

1. A cement composition comprising a mixture of Portland cement, mineral aggregate, about 5%–25% based on the weight of said Portland cement of styrene-butadiene-1,3 copolymer having a styrene to butadiene weight ratio of about 30:70 to 70:30, water in amount not in excess of about 40% based on the weight of said Portland cement, and, based on the weight of said copolymer, (a) 2–10% of non-ionic surfactant, (b) 1–7.5% of anionic surfactant, at least 15% of which is a sodium alkyl sulfate in which the alkyl group contains 9–17 carbon atoms, and (c) 1–5% of polyorganosiloxane fluid surfactant, the sum of (a) and (b) not exceeding about 11% by weight of said copolymer and the weight ratio of (a) to (b) being within the range of about 0.7:1 to 10:1.

2. The composition of claim 1 in which the non-ionic surfactant is octylphenoxynonaoxyethyleneethanol, the anionic surfactant comprises a mixture of an alkyl aryl sulfonate and a sodium alkyl sulfate, at least 15% of said anionic surfactant being a sodium sulfate in which the alkyl group contains 9 to 17 carbon atoms, and the polyorganosiloxane fluid surfactant is polymethylsiloxane.

3. The composition of claim 2 in which the alkyl aryl sulfonate is dodecylbenzene sodium sulfonate.

4. A cement composition comprising a mixture of Portland cement, about 5%–25% based on the weight of said Portland cement of styrene-butadiene-1,3 copolymer having a styrene to butadiene weight ratio of about 30:70 to 70:30, water in amount not in excess of about 40% based on the weight of said Portland cement, and, based on the weight of said copolymer, (a) 2%–10% of non-ionic surfactant of the group consisting of fatty acid esters, acid derivatives of ethylene oxide, condensation products of ethylene oxide with alcohols, condensation products of ethylene oxide with phenols, condensation products of ethylene oxide with alkyl phenols, and mixtures of said non-ionic surfactants, (b) 1%–7.5% of anionic surfactant from the group consisting of alkyl aryl sulfonates, sulfate derivatives of fatty alcohols of 9–17 carbon atoms, sulfonated animal oils, sulfonated vegetable oils, and mixtures thereof provided however that at least 15% of said anionic surfactant is a sodium alkyl sulfate in which the alkyl group contains 9–17 carbon atoms, and (c) 1%–5% of polymethylsiloxane fluid, the sum of (a) and (b) not exceeding about 11% by weight of said copolymer, and the weight ratio of (a) to (b) being within the range of about 0.7:1 to 10:1.

5. A method for making a cement composition which comprises intimately mixing Portland cement, mineral aggregate, a dispersion of styrene-butadiene-1,3 copolymer having a styrene to butadiene weight ratio of about 30:70 to 70:30, water in an amount not in excess of about 40% based on the weight of said Portland cement, and, based on the weight of said copolymer, (a) 2–10% of non-ionic surfactant, (b) 1–7.5% of anionic surfactant, at least 15% of which is a sodium alkyl sulfate in which the alkyl group contains 9–17 carbon atoms, and (c) 1–5% of polyorganosiloxane fluid surfactant, the sum of (a) and (b) not exceeding about 11% by weight of said copolymer and the weight ratio of (a) to (b) being within the range of about 0.7:1 to 10:1.

References Cited in the file of this patent

UNITED STATES PATENTS

| | | |
|---|---|---|
| 2,595,797 | Leyonmark et al. | May 6, 1952 |
| 2,662,064 | Mead | Dec. 8, 1953 |
| 2,731,433 | Johnson | Jan. 17, 1956 |
| 2,769,713 | Wilson | Nov. 6, 1956 |
| 2,867,603 | Safford et al. | Jan. 6, 1959 |

FOREIGN PATENTS

| | | |
|---|---|---|
| 757,592 | Great Britain | Sept. 19, 1956 |
| 147,189 | Australia | July 7, 1952 |

OTHER REFERENCES

Zimmerman et al.: "Handbook of Material Trade Names" (1953), Industrial Research Service, Dover, New Hampshire, pages 178–180.